P. S. RYDBECK.
BALL BEARING.
APPLICATION FILED AUG. 1, 1918.
1,366,026. Patented Jan. 18, 1921.
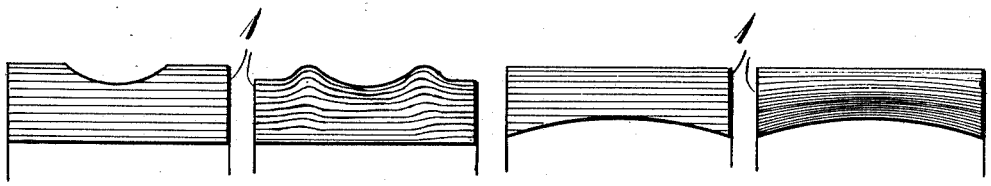
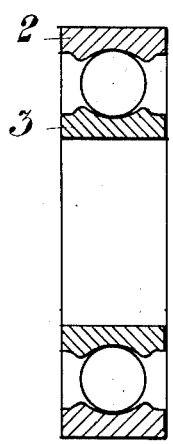 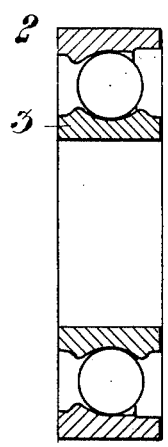 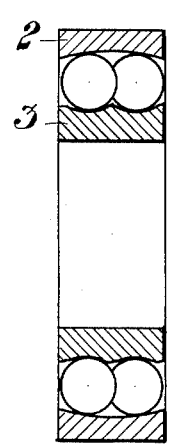
INVENTOR.
Patrik Samuel Rydbeck
By Attys.

UNITED STATES PATENT OFFICE.

PATRIK SAMUEL RYDBECK, OF GOTTENBORG, SWEDEN, ASSIGNOR TO AKTIEBOLAGET SVENSKA KULLAGERFABRIKEN, OF GOTTENBORG, SWEDEN, A CORPORATION OF SWEDEN.

BALL-BEARING.

1,366,026.  Specification of Letters Patent.  Patented Jan. 18, 1921.

Application filed August 1, 1918. Serial No. 247,782.

*To all whom it may concern:*

Be it known that I, PATRIK SAMUEL RYDBECK, a subject of the King of Sweden, residing at Gottenborg, in the Kingdom of Sweden, have invented certain new and useful Improvements in Ball-Bearings, of which the following is a specification.

The modern ball bearings consisting of two track rings made with the greatest accuracy and having uninterrupted ball races and balls which, placed between said races, connect the whole so as to form a nonadjustable machine element, have obtained a wide use, owing to their safe working and their capability of sustaining heavy loads. The track rings of such ball bearings have hitherto generally been made by turning bars, pipes or plates. In such a manufacture, however, the turning of the ball races is a very tedious work and, moreover, causes a considerable loss of material. On account thereof, such ball bearings, even when manufactured in large quantities and by time-saving working methods, have hitherto been rather expensive.

A further drawback connected especially with track rings produced by turning solid drawn or rolled pipes, or forged plates, consists in this that, especially in the case of continued and heavy overloads, particularly axial thrusts, rapid wear or so-called peeling of the track races will easily occur. Probably, this peeling depends upon the fact that the fibers of the material lying in the axial direction of the track-ring blanks, when made of solid drawn or rolled pipes, are cut through in turning the ball-races, by which the resistibility of the said ball races to wear will be considerably reduced.

This invention relates to ball bearings having ball races in both rings or a ball race in one ring and a spherical track in the other ring, and the object of the invention is to produce a ball bearing of this kind which does not differ externally to any appreciable extent from the common ball bearings, but, owing to the method of manufacture, is essentially cheaper and much more resistive to wear than the common ball bearings.

The primary object of the invention is to produce a ball bearing of the type hereinbefore mentioned in which the ring profile containing the ball races is formed by displacement and compression in axial direction of the material of a substantially cylindrical ring blank. By this not only a cheaper product is obtained, owing to a simpler method of manufacture and saving of material, but at the same time the material advantage is gained that the structure of fiber of the ready-made track rings remains undestroyed and is caused to conform to the profile of the ball races, next to said races, and to successively take up a position parallel to the axis of the bearing, at a distance from said races, thus rendering the resistibility of the track rings to wear much more favorable than is the case with turned track rings.

In the drawings, Figure 1 is a cross-section of a track ring having a ball race produced by turning. Fig. 2 is a cross-section of a track ring having a ball race produced, according to the invention, by displacement and compression of the material. Fig. 3 is a cross-section of a track ring having a spherical ball race produced, as usual, by turning. Fig. 4 is a cross-section of a similar track ring produced according to the invention. Fig. 5 is a cross-section of a single row annular ball bearing according to the invention. Fig. 6 is a cross-section of a single row ball bearing according to the invention, in which the outer track ring is provided with a shoulder at the one side only of the ball race (*i. e.* a ball bearing adapted especially for magneto-electromotive apparatus). Fig. 7 is a cross-section of a double row ball bearing having a spherical outer ball race.

Referring to the drawings, and more particularly to Figs. 1 to 4 thereof, showing the track rings on an enlarged scale, 1 denotes schematically the structure of fiber. As will appear from Figs. 1 and 3, in which the ball races are supposed to be produced by turning, the structure of fiber is cut through, by which, especially in case of overloads, a peeling of the layers of the material can occur, so that the ball races as well as the balls will be rapidly worn. On the contrary, in the track rings shown in Figs. 2 and 4, in which the ball races are produced by displacement of the material, the structure of fiber will not be cut through, but conforms to the profile of the ball race, next to said race, so that the risk of peeling is, practically, excluded.

In the ball bearings shown in Figs. 5 to 7, the outer track rings 2 as well as the inner track rings 3 are made from a piece of pipe of a length exceeding the width of the ready made ring to such an extent that the excess material will be sufficient for forming the shoulders of the ball races and the spherical ball race of the outer ring of spherical bearings. Preferably, the displacement of the material is performed by upsetting the ring blanks in a cold or hot state through axial pressure, while the ring blank is held fixed in a die, and simultaneously a suitable mandrel is introduced beforehand or during the pressing operation into the aperture of the ring. In this case, the space between the die and the centrally arranged mandrel has the same form as the ready-made ring, and the said space is entirely filled out through the displacement of the material, when upsetting the ring blank in the longitudinal direction at the pressing operation. At the same time, also compression of the ring material may be affected, so that the surface is hardened, due to the displacement of the material under pressure against the polished surfaces of the pressing tools. Obviously, in order that the ready-made ring may be removed, the die must, in pressing the inner rings, be divided in a suitable manner, whereas, in pressing the outer rings, the mandrel is to be correspondingly divided. If the rings be made with a shoulder at the one side only of the ball race, undivided dies and mandrels may be used.

If a higher degree of accuracy be desired, the rings may, after the pressing operation, be hardened and ground as usual, and, if desired, the ball races may be polished.

In ball bearings according to this invention the track rings may be of normal thickness, so that said ball bearings may conform, in this respect, to the dimensions of the standardized annular ball bearings, and the outer track rings may obtain true cylindrical external surfaces, and the inner track rings may obtain true cylindrical or conical internal surfaces. The said ball bearings differ essentially in these respects from ball bearings having track rings made by pressing thinner plates, in which the profile of the ball race is made, wholly or to a great extent, by bending the material of the ring blank. In this latter case, the profile of the ball race traverse the whole cross-section of the ring which will, therefore, obtain also at the side opposite the ball race a profile corresponding more or less completely to the profile of the ball race.

The aforesaid peculiar structure of fiber may easily be inspected by etching a polished cross-section of the track ring.

What I claim is:—

1. A ball-bearing ring, provided with a concave ball race, the profile of which is formed by displacement of the material of a substantially cylindrical ring-blank in a direction substantially at right angles to said ball race.

2. A ball-bearing having track rings provided with ball-races, the profile of which is formed by displacement of the material of substantially cylindrical ring-blanks by pressure in axial direction.

3. A ball-bearing ring, provided with a concave ball-race, the profile of which is formed by displacement and compression of the material of a cylindrical ring-blank in a direction substantially at right angles to the said ball race.

4. A ball-bearing ring, provided with a concavely spherical ball-track, the profile of which is formed by displacement of the material of a substantially cylindrical ring-blank by pressure in axial direction.

5. A ball-bearing, having track-rings provided with concave ball-races, the structure of fiber of said track-rings conforming to the profile of the ball-races.

6. A ball-bearing ring, having a concave ball-race, the structure of the fiber of the metal conforming to the profile of the ball-race.

7. A ball-bearing ring having a concave ball race the fiber structure of the metal extending generally in direction axially of the ring and curved in conformity with the concavity of such ball race.

In testimony whereof I affix my signature.

PATRIK SAMUEL RYDBECK.